(12) United States Patent
Nikolov

(10) Patent No.: US 7,919,882 B2
(45) Date of Patent: Apr. 5, 2011

(54) SYSTEM, METHOD, AND COMPUTER SOFTWARE CODE FOR CONTROLLING MULTIPLE GENERATORS OF A POWERED SYSTEM

(75) Inventor: Emil N. Nikolov, Erie, PA (US)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 12/254,873

(22) Filed: Oct. 21, 2008

(65) Prior Publication Data

US 2010/0096932 A1    Apr. 22, 2010

(51) Int. Cl.
*B60L 1/00* (2006.01)
(52) U.S. Cl. ........................................ 307/9.1
(58) Field of Classification Search ............. 307/57, 307/9.1
See application file for complete search history.

(56) References Cited

U.S. PATENT DOCUMENTS

| | | | | |
|---|---|---|---|---|
| 4,456,830 A | * | 6/1984 | Cronin | 290/27 |
| 4,585,982 A | | 4/1986 | Cooper et al. | |
| 4,912,378 A | | 3/1990 | Vukosavic | |
| 5,422,570 A | | 6/1995 | Moreira | |
| 5,930,134 A | * | 7/1999 | Glennon | 363/127 |
| 6,657,416 B2 | * | 12/2003 | Kern et al. | 322/29 |
| 7,262,520 B2 | * | 8/2007 | Nguyen et al. | 307/86 |

* cited by examiner

*Primary Examiner* — Robert L. DeBeradinis
(74) *Attorney, Agent, or Firm* — Robert Wawrzyn, Esq.; Terry M. Sanks, Esq.; Beusse Wolter Sanks Mora & Maire, P.A.

(57) ABSTRACT

A system for controlling a plurality of generators of a powered system, the system includes a controller configured to provide a command to energize at least a first generator and a second generator depending on an operational condition of the powered system, a switching device configured to connect the first generator and/or the second generator to the controller, and a rectifier connected between the controller and the switching device. The switch position of the switching device determines whether the first generator and/or the second generator is energized, depending on the operational condition of the powered system. A method and a computer software code for controlling a plurality of generators of a powered system are also provided.

17 Claims, 3 Drawing Sheets

SYSTEM, METHOD, AND COMPUTER SOFTWARE CODE FOR CONTROLLING MULTIPLE GENERATORS OF A POWERED SYSTEM

BACKGROUND OF THE INVENTION

This invention relates generally to a multi-winding electric power supply and, it relates more particularly to a system, method, and computer software code for controlling multiple alternators.

Propulsion systems for traction vehicles, such as but not limited to locomotives and off-highway vehicles, commonly use a diesel engine prime mover to drive an electric generating system for supplying energy to a plurality of pairs of direct current (DC) traction motors. The generating system typically includes a 3-phase traction alternator whose alternating voltage output is rectified and applied to relatively positive and negative DC buses between which the respective pairs of motors are connected in parallel. The output power of the alternator is regulated, or varied, by suitably controlling the strength of its field excitation and the rotational speed of the engine. For maximum efficiency, the controls of the propulsion system are suitably designed to work the engine on its full horsepower curve throughout a wide speed range of the vehicle.

FIG. 1 discloses a prior art circuit illustrating a cranking scheme and traction alternator regulation for a powered system, such as but not limited to a locomotive. This cranking scheme is generally used with DC locomotives. Two groups of power electronics and corresponding control micro-electronics are disclosed. The two groups have identical power electronics sections and similar micro-electronics sections. The power electronics section of each group may be a rectifier bridge 12, 14 or other rectifier-type device, formed of a plurality of silicon- or semiconductor-controlled rectifiers (SCR) or other power components. A first bridge 12 is a 3-phase full wave rectifier bridge (3 pairs of SCRs—6 SCRs in total—3 legs). A second bridge 14 is a $3^{rd}$ harmonic commutation inverter, comprised of a similar 3-phase full wave rectifier bridge. The second bridge 14 and an additional auxiliary commutation leg ($4^{th}$ leg) 20 (with a similar pair of SCRs), form a converter (4 pairs of SCRs—8 SCRs in total—4 legs). The first bridge 12, or first group of SCRs, or first group of power electronics, is connected to an auxiliary alternator or other generator 16 (occasionally referred to herein as the second generator). A traction alternator controller (TAC) central processor unit (CPU) card 18 (referred to as the "TAC Control CPU Card" in FIG. 1) is used to control the operation of the first bridge 12. The second bridge 14 is connected to a main traction alternator or other rotatable synchronous generator 22 (occasionally referred to herein as the first generator). A cranker controller CPU card 24 (referred to as the "Cranker Control CPU Card" in FIG. 1) is used to control the second bridge 14. The two controllers 18, 24 operate alternatively, where only one controller operates at any given time. More specifically, the cranker controller 24 is generally used when starting an engine and the traction alternator controller 18 is generally used while the engine is operating to provide power to auxiliary subsystems on the locomotive.

The cranker controller 24 typically provides control firing pulses for a current-fed, third harmonic commutation SCR inverter (e.g., the second bridge 14), thus supplying variable frequency alternating current to the 3-phase stator windings of the first generator 22 and DC current for the machine field, which is used to start or "crank" the engine. Specifically, the first generator 22 is operated as a motor and the rotor of the generator is coupled to the crankshaft of the engine to rotate the crankshaft for starting. Initially the output torque of the rotor (and hence the magnitude of current in the stator windings) needs to be relatively high in order to start turning the crankshaft. As the rotor accelerates from rest, less torque (and current) will be required, while the fundamental frequency of load current increases with speed (revolutions per minute). In its cranking mode of operation, the cranker controller 24 is responsible for varying the firing commands for the second bridge 14, thus supplying current of properly varying magnitude and frequency until the engine crankshaft is rotating at a rate that equals or exceeds the minimum speed at which normal running conditions of the engine can be sustained.

The first bridge 12 and second bridge 14 may be a third harmonic auxiliary impulse commutated converter having six main unidirectional conduction controllable electric valves, such as thyristors, that are interconnected in pairs of series aiding alternately conducting valves to form a conventional 3-phase, double-way, 6-pulse bridge between a pair of DC terminals, and a set of three AC terminals. During cranking the DC terminals of each bridge 12, 14 are adapted to be connected to an on-board locomotive battery 27. The AC terminals of the aforesaid bridges 12, 14 are respectively connected to the different phases of a 3-phase electric load circuit, which typically comprises the star-connected 3-phase stator windings of each respective generator 16, 22.

As illustrated, gates 25, or switches, are provided to connect/disconnected the battery 27. As further illustrated, the battery 27 is connected to inductors 29 and resistors 31. The inductors 29 are power storage devices and the resistors 31 regulate current. Those skilled in the art will readily recognize that the illustrated configuration of the inductors 29 and resistors 31 is not limiting. Other configurations may be utilized to regulate current and store power, and other components, such as but not limited to a variable diode, may also be utilized. Further, the number of inductors 29 and resistors 31 may vary as well.

With respect to both the main traction alternator 22, or first generator, and the auxiliary alternator 16, or second generator, when supplying the load circuit with 3-phase alternating current, the six main valves of each respective bridge 12, 14 are cyclically turned on (i.e., rendered conductive) in a predetermined sequence in response to a family of "firing" signals (e.g., gate pulses) that are periodically generated in a prescribed pattern and at desired moments of time by associated controllers, specifically a traction alternator controller 18 with respect to the first bridge 12 and the cranker controller 24 with respect to the second bridge 14. With respect to the main traction alternator 22, or first generator, to periodically turn off the main valves by forced commutation, the cranker controller 24 with the second bridge 14 are further provided with an auxiliary commutation leg 20, or the $4^{th}$ pair of SCRs, that includes a pre-charged commutation capacitor 26 and at least seventh and eighth alternately conducting unidirectional controllable electric valves that are arranged to connect the capacitor 26 between the neutral or common point of the 3-phase AC load circuit and either one of the DC terminals of the bridge.

When systems are composed of multiple elements, a preference is to reduce a number of elements that are part of any given system. This desire is further preferred when redundant elements are provided to perform similar functions. Towards this end, locomotive operators and owners would benefit from having a minimum number of parts for use with both the power electronics used with the locomotive's auxiliary alternator and the main traction alternator. Likewise, operators and owners of other powered systems that utilize multiple power generators having duplicate parts would realize a financial benefit from having a minimum number of parts for the power electronics used for both an auxiliary alternator and a main alternator.

BRIEF DESCRIPTION OF THE INVENTION

Embodiments of the present invention relate to a system, method and a computer readable media for controlling a plurality of alternators or other generators on a powered system where a single control subsystem is utilized. In one aspect, the system includes a controller configured to provide a command to energize at least a first generator and a second generator motive, depending on an operational condition of the powered system. A switching device is configured to selectively connect the first generator and/or the second generator to the controller. A rectifier is connected between the controller and the switching device. The switch position of the switching device determines whether the first generator and/or the second generator are energized through control of the rectifier, with the switch position depending on the operational condition of the powered system.

In another embodiment, a cranking and operating system is disclosed that includes a controller configured to provide a command to energize a first generator and/or a second generator. A switching device is configured to allow the controller to energize the first generator and/or the second generator individually.

In yet another embodiment, the method includes energizing a first generator whereby the first generator operates in a motoring mode to rotate an engine crankshaft to start an engine. A rectifier is disconnected from the first generator once the first generator is energized and/or the engine has started. The rectifier is connected to a second generator. The second generator is energized to provide power to at least one subsystem of the powered system.

In another embodiment, the computer software code is stored on a computer readable media and is executed with a processor. The computer software code includes a computer software module for energizing a first generator whereby the first generator operates in a motoring mode to rotate an engine crankshaft to start an engine. As should be appreciated, for this software module and the others described herein, the stated function(s) is typically carried out when the software module is executed with the processor. A computer software module is provided for disconnecting a rectifier from the first generator once at least of the first generator is energized and the engine has started. A computer software module is also provided for connecting the rectifier to a second generator. A computer software module is further provided for energizing the second generator to provide power to another subsystem of the powered system, when executed with the processor.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which.

DETAILED DESCRIPTION OF THE INVENTION

Figure 1:
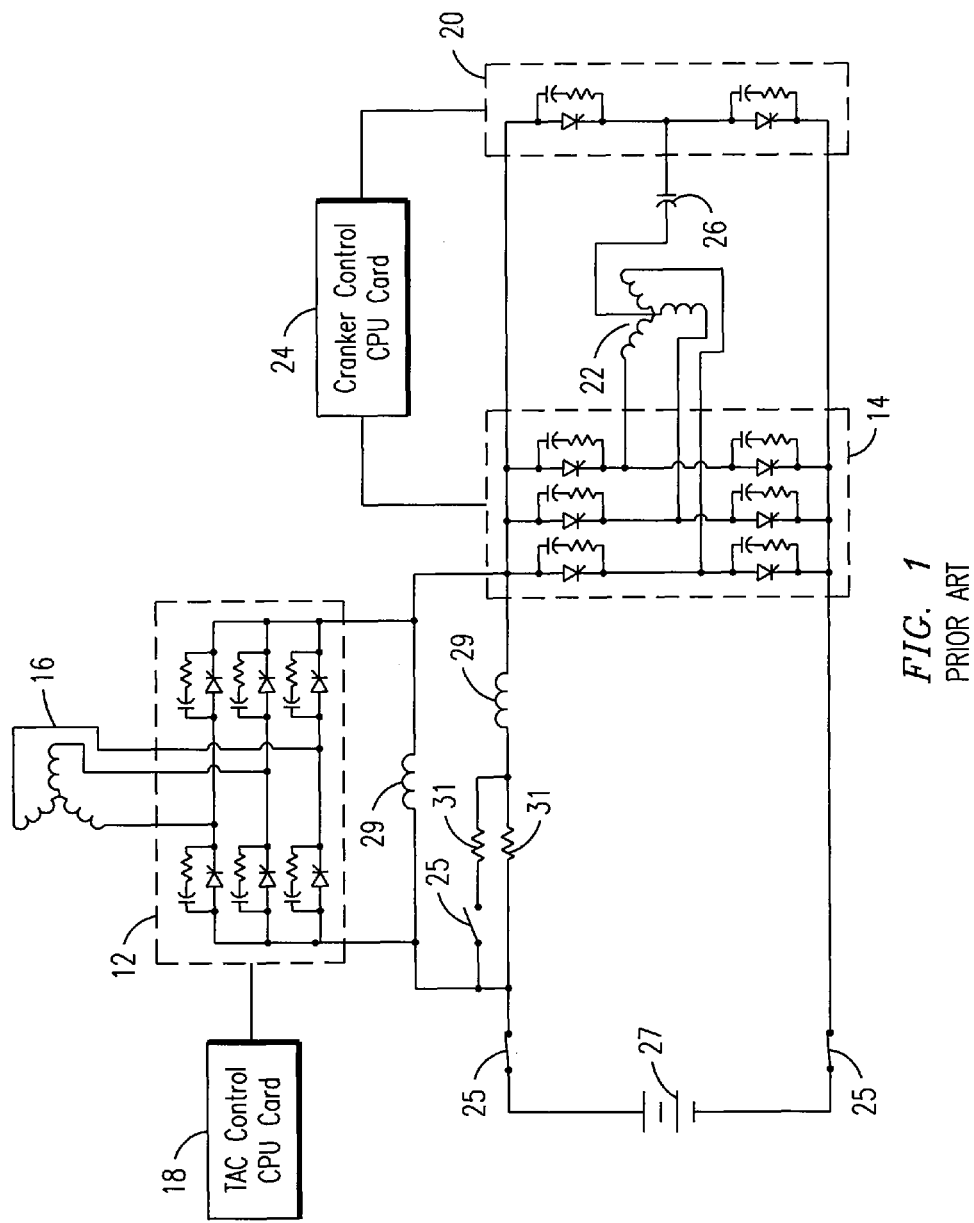
FIG. 1 discloses a prior art illustration of a circuit providing for a cranking scheme and traction alternator regulation.

Though exemplary embodiments of the present invention are described with respect to rail vehicles, or railway transportation systems, specifically locomotives having diesel engines, exemplary embodiments of the invention are also applicable for other uses, such as but not limited to off-highway vehicles, marine vessels, stationary units, and, agricultural vehicles, transport buses, each which may use at least one diesel engine, or diesel internal combustion engine and may have a plurality of alternators. Even though diesel powered systems are disclosed, those skilled in the art will readily recognize that embodiments of the invention may also be utilized with non-diesel powered systems, such as but not limited to natural gas powered systems, bio-diesel powered systems, etc. Furthermore, as disclosed herein such non-diesel powered systems, as well as diesel powered systems, may include multiple engines, other power sources, and/or additional power sources, such as, but not limited to, battery sources, voltage sources (such as but not limited to capacitors), chemical sources, pressure based sources (such as but not limited to spring and/or hydraulic expansion), current sources (such as but not limited to inductors), inertial sources (such as but not limited to flywheel devices), gravitational-based power sources, and/or thermal-based power sources.

Exemplary embodiments of the invention solves problems in the art by providing a system, method, and computer implemented method, such as a computer software code, for controlling multiple alternators of a powered system where a single control subsystem is utilized. Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Broadly speaking, a technical effect is to control a plurality of alternators or other generators used in a powered system, wherein a single control subsystem is utilized for controlling the alternators. To facilitate an understanding of the exemplary embodiments of the invention, it is described hereinafter with reference to specific implementations thereof. Exemplary embodiments of the invention may be described in the general context of computer-executable instructions, such as program modules, being executed by any device, such as but not limited to a computer, designed to accept data, perform prescribed mathematical and/or logical operations usually at high speed, where results of such operations may or may not be displayed. Generally, program modules include routines, programs, objects, components, data structures, etc. that perform particular tasks or implement particular abstract data types. For example, the software programs that underlie exemplary embodiments of the invention can be coded in different programming languages, for use with different devices, or platforms. In the description that follows, examples of the invention may be described in the context of a web portal that employs a web browser. It will be appreciated, however, that the principles that underlie exemplary embodiments of the invention can be implemented with other types of computer software technologies as well.

Referring now to the drawings, embodiments of the present invention will be described. Wherever possible, the same reference numerals used throughout the drawings refer to the same or like parts. Exemplary embodiments of the invention can be implemented in numerous ways, including as a system (including a computer processing system), a method (including a computerized method), an apparatus, a computer readable medium, and/or a computer program product. Several embodiments of the invention are discussed below.

Figure 2:
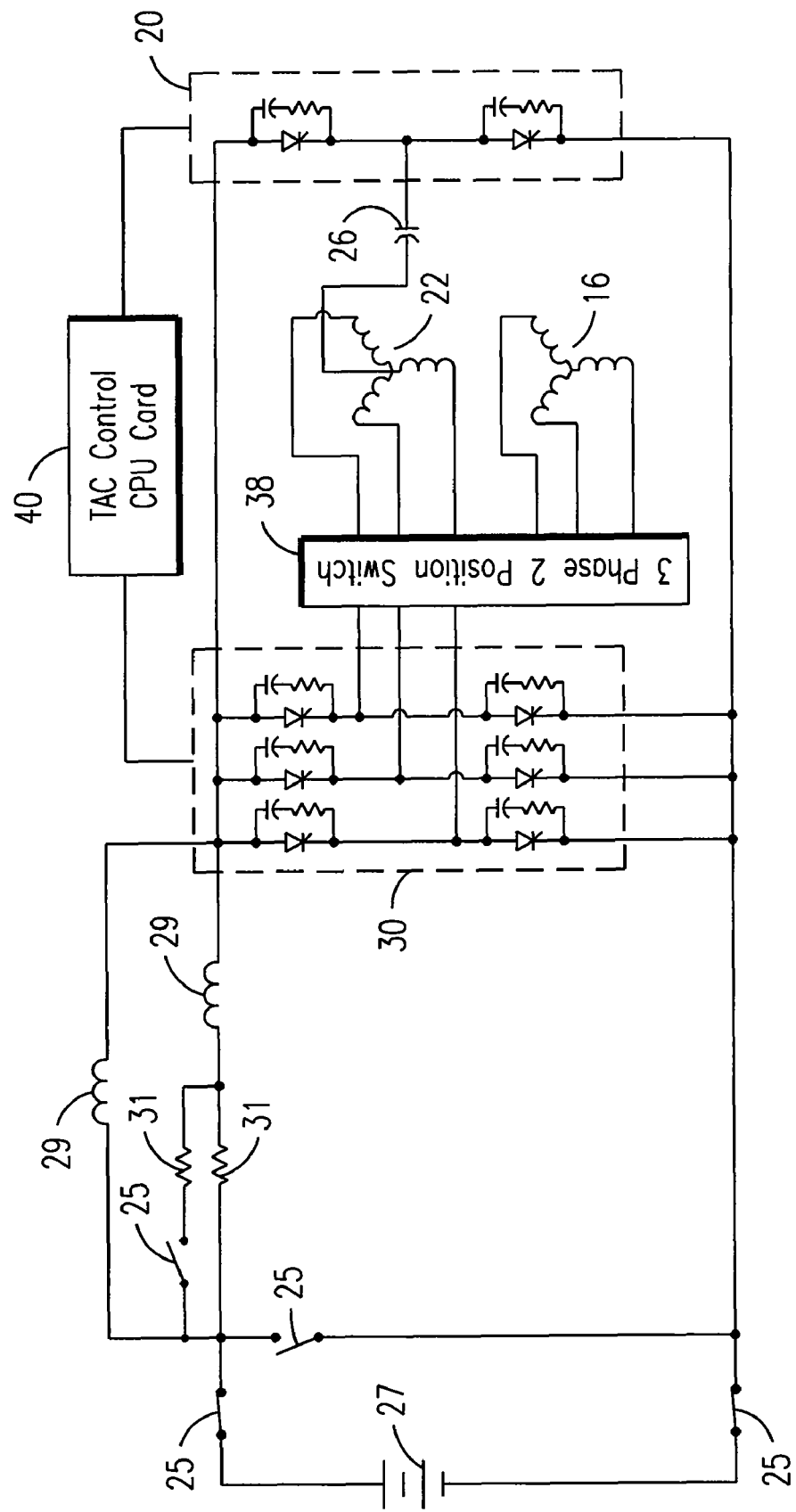
FIG. 2 discloses an exemplary embodiment of a circuit providing for a cranking scheme and traction alternator regulation having minimum elements.

FIG. 2 discloses an exemplary embodiment of a circuit providing for a cranking scheme and traction alternator regulation having minimum elements. The cranking scheme and traction alternator regulation is for use with an engine in a powered system. The powered system may have a main rectifier bridge 30, or a first set of power electronics, having AC input terminals connected to stator terminals of at least a first synchronous generator 22, or first alternator (e.g., main traction alternator), and a second synchronous generator 16, or second alternator (e.g., auxiliary alternator). The first generator 22 may include a field winding and a rotor connected in driving relationship to a crankshaft of the engine. The second generator 16 may include a field winding and a rotor connected in relationship to a secondary system of the powered system. As disclosed in FIG. 1, the powered system may further include a battery 27 selectively connectable to a positive and a negative DC bus of the bridge 30. As further disclosed in FIG. 1, gates/switches 25, at least one inductor 29, and at least one resistor 31 may also be provided.

More specifically, instead of three groups of power electronics (e.g., three groups of silicon- or other semiconductor-controlled rectifiers (SCR)) as disclosed in FIG. 1, only two groups of power electronics are provided. The first group, specifically, the main bridge 30, is connected to both the first generator 22 and to the second generator 16 by way of a switching device 38, such as, but not limited to, a 3-phase, 2-position switch. A single traction alternator controller (TAC) 40, having a control central processing unit card (collectively referred to in FIG. 2 as the "TAC Control CPU Card"), is used to control the operation of the main bridge 30. (The second group of power electronics in the system is an auxiliary commutation leg 20 described below.)

Though a first generator 22 and a second generator 16 are disclosed, those skilled in the art will readily recognize that more than two alternators or other generators may be included. When more than two generators are included the switching device 38 is configured to accommodate the number of generators included. For example, if three generators are included, instead of the switching device 38 being a 3-phase, 2-position switch, the switching device 38 is a 3-phase, 3-position switch.

In operation, the TAC 40 controls the switch 38 to selectively connect either the first generator 22 or the second generator to the rectifier bridge 30. The position of the switch (and therefore which generator is connected to the bridge 30) is based on one or more operational conditions of the engine. For example, if the engine is in a startup operational condition, the TAC 40 controls the switch position for connecting the first generator 22 to the bridge 30. Subsequently, the TAC 40 controls the bridge 30 (and other power components), as described in more detail below, to energize the first generator 22 for cranking the engine crankshaft. Thus, one embodiment of the present invention relates to a control system for controlling a plurality of generators of a powered system. The control system includes a switching device configured to selectively connect a first generator or a second generator to a rectifier. The control system also includes a controller configured to control the rectifier for energizing the first generator and the second generator. The controller is further configured to control a switch position of the switching device for connecting a selected one of the first or second generators to the rectifier, for energizing the selected generator through control of the rectifier, depending on an operational condition of the powered system.

With respect to each generator and depending on the switching position of the switching device, the TAC 40 provides the firing commands to a current-fed, third harmonic commutation converter (as disclosed with respect to FIG. 1, the converter is a combination of the bridge 30 and an additional auxiliary commutation leg or $4^{th}$ leg 20), for supplying variable frequency alternating current to a 3-phase stator windings of the rotatable first synchronous generator 22, which is used to start or "crank" the engine. In other words, the first generator 22 is operated as a motor and the rotor of the generator 22 is coupled to a crankshaft of an engine to rotate the crankshaft for starting. Initially the output torque of the rotor (and hence the magnitude of current in the stator windings) needs to be relatively high in order to start turning the crankshaft. As the rotor accelerates from rest, less torque (and current) will be required, while the fundamental frequency of load current increases with speed (revolutions per minute). In its cranking mode of operation, the TAC controller 40 is responsible for supplying of the control firing commands, in order to properly vary magnitude and frequency until the engine crankshaft is rotating at a rate that equals or exceeds the minimum speed at which normal running conditions of the engine can be sustained.

As illustrated, the main bridge 30 may be a third harmonic commutation inverter having six main unidirectional conduction controllable electric valves, such as thyristors, that are interconnected in pairs of series aiding alternately conducting valves to form a conventional 3-phase, double-way, 6-pulse bridge between a pair of DC terminals and a set of three AC terminals. During cranking the DC terminals of the bridge are adapted to be connected to the on-board locomotive battery 27. The AC terminals of the aforesaid bridge 30 are respectively connected, by way of the 3-phase, 2-position switch 38, to the different phases of each 3-phase electric load circuit, which typically include the star-connected 3-phase stator windings of each respective generator 16, 22.

With respect to both the main traction alternator, or first generator 22, and the auxiliary alternator, or second generator 16, when supplying the load circuit with 3-phase alternating current, the six main valves of the bridge 30 are cyclically turned on (i.e., rendered conductive) in a predetermined sequence in response to a family of "firing" signals (e.g., gate pulses) that are periodically generated in a prescribed pattern and at desired moments of time by the TAC controller 40. The auxiliary commutation leg ($4^{th}$ leg) 20 includes a pre-charged commutation capacitor 26 and at least seventh and eighth alternately conducting unidirectional controllable electric valves that are arranged to connect the capacitor 26 between the neutral or common point of the main 3-phase AC load circuit, or main traction alternator 22, and either one of the DC terminals of the bridge.

Figure 3:
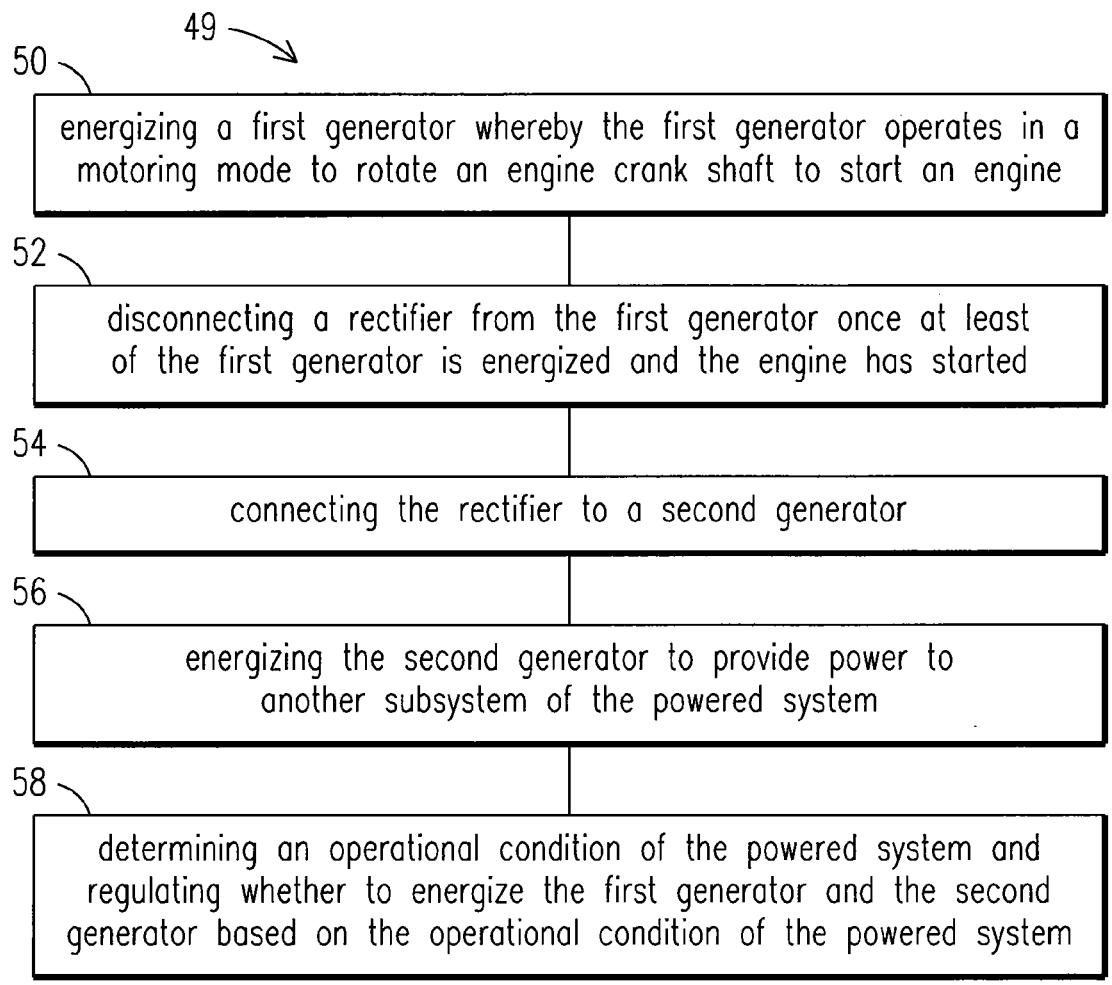
FIG. 3 discloses an illustration of a flow chart illustrating an exemplary embodiment for cranking and operating an engine in a powered system having a plurality of alternators or other generators.

FIG. 3 shows a flowchart illustrating an exemplary embodiment of a method for cranking and operating an engine in a powered system having a plurality of alternators or other generators. As illustrated in the flowchart 49, the first generator may be energized so that the first generator operates in a motoring mode to rotate an engine crankshaft to start an engine, at 50. The first generator is energized through control of a rectifier selectively connected to the first generator, e.g., through a switch unit or otherwise. The rectifier is disconnected from the first generator once the first generator is energized and/or the engine has started, at 52. The rectifier is connected to a second generator, at 54. The second generator is energized to provide power to another subsystem of the powered system, at 56. A determination is made regarding an operational condition of the powered system and regulating of whether to energize the first generator and/or the second generator is made based on the operational condition of the powered system, at 58.

Though FIG. 3 utilizes the terms "connecting" and "disconnecting," those terms are not limiting. Specifically "disconnecting" may mean physically severing a connection and/or cease providing communication, such as, but not limited to, ceasing to provide electrical power between two components. Likewise "connecting" may mean physically attaching the components and/or providing a communication between the components, such as, but not limited to, allowing electrical power to flow between the components.

As disclosed above, the method illustrated in FIG. 3 may be performed with a computer software code having computer software modules. The computer software code is stored on a computer readable media and is operable with a processor. Therefore, energizing a first generator may be performed by the computer software code having a module that commands when to energize the first generator, when executed by the processor. Similarly a command may be provided for disconnecting the rectifier from the first generator, connecting the rectifier to the second generator, and energizing the second generator, in each situation when executed by the processor.

Figure 4:
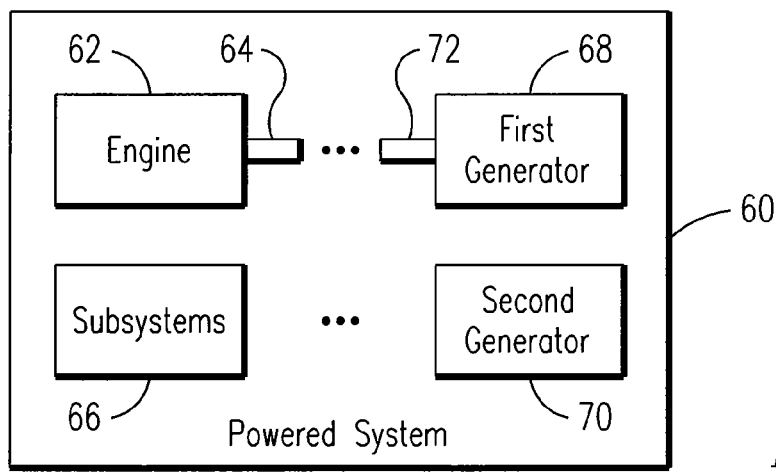
FIG. 4 is a schematic of a powered system.

FIG. 4 shows an exemplary powered system 60 in schematic. The powered system includes an engine 62 with a crankshaft 64. The powered system also includes one or more subsystems 66, a first alternator or other generator 68 (e.g., the main traction alternator 22 described above), and a second alternator or other generator 70 (e.g., the auxiliary alternator 16 described above). As noted above, in one embodiment the first generator 68 is operated as a motor and the rotor 72 of the generator 68 is operably coupled to the crankshaft 64 of the engine 62 to rotate the crankshaft for starting. Suitable configurations for interfacing a generator and a crankshaft in this regard are well known in the art, and therefore further detail regarding the engine, crankshaft, etc. are not provided herein. The same is true for interfacing the second generator 70 with one or more of the subsystems 66.

While the invention has been described herein with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc., do not denote any order or importance, but rather the terms first, second, etc., are used to distinguish one element from another.

What is claimed is:

1. A system for controlling a plurality of generators of a powered system, the system comprising:
   a controller configured to provide a command to energize at least a first generator and a second generator, depending on an operational condition of the powered system;
   a switching device configured to connect the first generator and/or the second generator to the controller; and
   a rectifier connected between the controller and the switching device;
   an auxiliary commutation leg configured to connect to the at least first generator;
   wherein the rectifier and the auxiliary commutation leg form a third harmonic commutation converter; and
   wherein a switch position of the switching device determines whether the first generator and/or the second generator is energized, depending on the operational condition of the powered system.

2. The system according to claim 1, wherein the first generator operates in a motoring mode to rotate an engine crankshaft to start an engine of the powered system when energized and the second generator operates to provide power to at least one other subsystem of the powered system when energized.

3. The system according to claim 1, wherein the controller commands the switching of the switching device in response to the operational condition of the powered system.

4. The system according to claim 1, wherein the switching device is a three-phased two-position switch.

5. The system according to claim 1, wherein the first generator and/or the second generator is an alternator.

6. A cranking and operating system for an engine in a powered system having a rectifier having AC input terminals connected to stator terminals of at least a first synchronous generator and a second synchronous generator, an auxiliary commutation leg connected between a neutral point of the first synchronous generator and a terminal of the rectifier, the first generator including a field winding and a rotor connected in driving relationship to a crankshaft of the engine, the second generator including a stator and/or a field winding and a rotor connected in relationship to at least one subsystem of the powered system, the powered system further including a battery selectively connectable to a positive and a negative DC bus of the rectifier, the cranking and operating system comprising:
   a controller configured to provide a command to energize the first generator and/or the second generator, based on an operational condition of the powered system; and
   a switching device configured to allow the controller to energize the first generator and/or the second generator individually.

7. The cranking and operating system according to claim 6, wherein the first generator operates in a motoring mode to rotate the engine crankshaft to start the engine when energized and the second generator operates to provide power to at least one subsystem of the powered system when energized.

8. The cranking and operating system according to claim 6, wherein the controller determines a switching rate of the switching device.

9. The cranking and operating system according to claim 6, wherein the switching device is a three-phased two-position switch.

10. The cranking and operating system according to claim 6, wherein a single rectifier is provided to energize the first generator and the second generator individually.

11. The cranking and operating system according to claim 10, wherein the single rectifier comprises a group of semiconductor-controlled rectifiers operating as the single rectifier.

12. The cranking and operating system according to claim 6, wherein the powered system comprises a railway transportation system, a marine vessel, an off-highway vehicle, a transportation vehicle, an agricultural vehicle, and/or a stationary power generating station.

13. A method for cranking and operating an engine in a powered system having a rectifier having AC input terminals connected to stator terminals of at least a first synchronous generator and a second synchronous generator, an auxiliary commutation leg connected between a neutral point of the first synchronous generator and a terminal of the rectifier, the first generator including a field winding and a rotor connected in driving relationship to a crankshaft of the engine, the second generator including a stator and/or a field winding and a rotor connected in relationship to at least one subsystem of the powered system, the powered system further including a battery selectively connectable to a positive and a negative DC bus of the rectifier, the method comprising:
    energizing the first generator whereby the first generator operates in a motoring mode to rotate the engine crankshaft to start the engine;
    disconnecting a rectifier from the first generator once the first generator is energized and/or the engine has started;
    connecting the rectifier to a second generator; and
    energizing the second generator to provide power to at least one subsystem of the powered system.

14. The method according to claim 13, further comprising determining an operational condition of the powered system and regulating whether to energize the first generator and the second generator based on the operational condition of the powered system.

15. The method according to claim 13, wherein the powered system comprises a railway transportation system, a marine vessel, an off-highway vehicle, a transportation vehicle, an agricultural vehicle, and/or a stationary power generating station.

16. A computer software code stored on a computer readable media and configured for execution with a processor designated for cranking and operating an engine in a powered system having a rectifier having AC input terminals connected to stator terminals of at least a first synchronous generator and a second synchronous generator, an auxiliary commutation leg connected between a neutral point of the first synchronous generator and a terminal of the rectifier, the first generator including a field winding and a rotor connected in driving relationship to a crankshaft of the engine, the second generator including a stator and/or a field winding and a rotor connected in relationship to at least one subsystem of the powered system, the powered system further including a battery selectively connectable to a positive and a negative DC bus of the rectifier, the computer software code comprising:
    a computer software module for energizing the first generator whereby the first generator operates in a motoring mode to rotate the engine crankshaft to start the engine, when executed with the processor;
    a computer software module for disconnecting a rectifier from the first generator once at least of the first generator is energized and the engine has started, when executed with the processor;
    a computer software module for connecting the rectifier to the second generator, when executed with the processor; and
    a computer software module for energizing the second generator to provide power to another subsystem of the powered system, when executed with the processor.

17. The computer software code according to claim 16, further comprising a computer software module for determining an operational condition of the powered system and a computer software module for regulating whether to energize the first generator and the second generator based on the operational condition of the powered system, when executed with the processor.

* * * * *